March 12, 1940.  J. VOTYPKA  2,193,607
VEHICLE BODY
Filed April 19, 1937   3 Sheets-Sheet 1
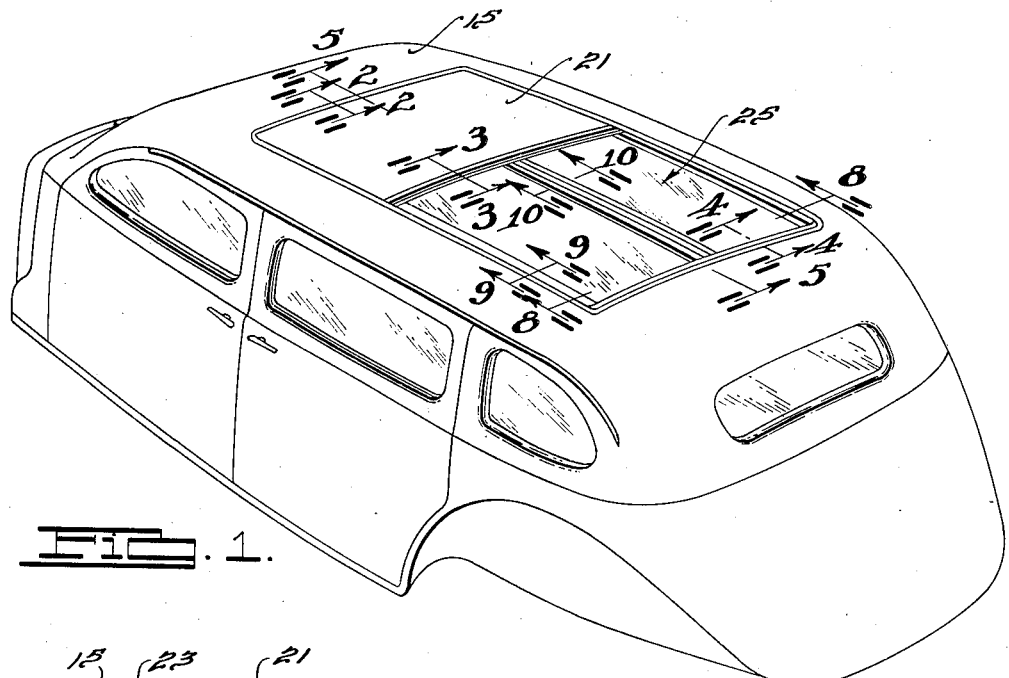
FIG. 1.
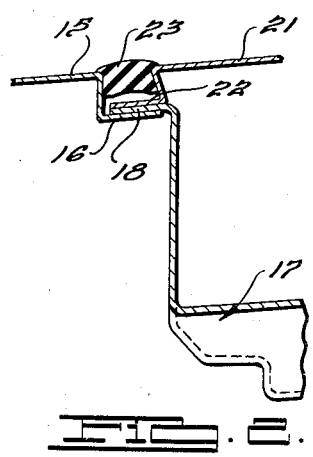
FIG. 2.
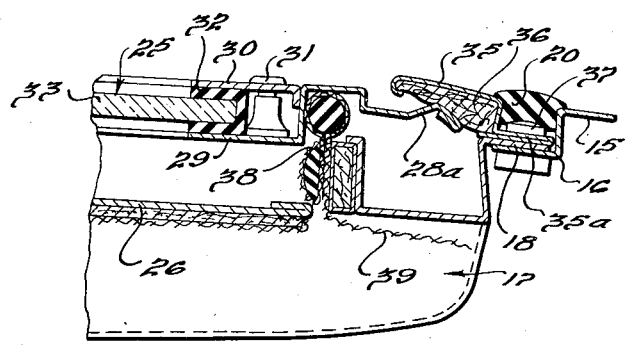
FIG. 4.
FIG. 3.
INVENTOR
John Votypka.
BY Dike, Calver & Gray
ATTORNEYS.

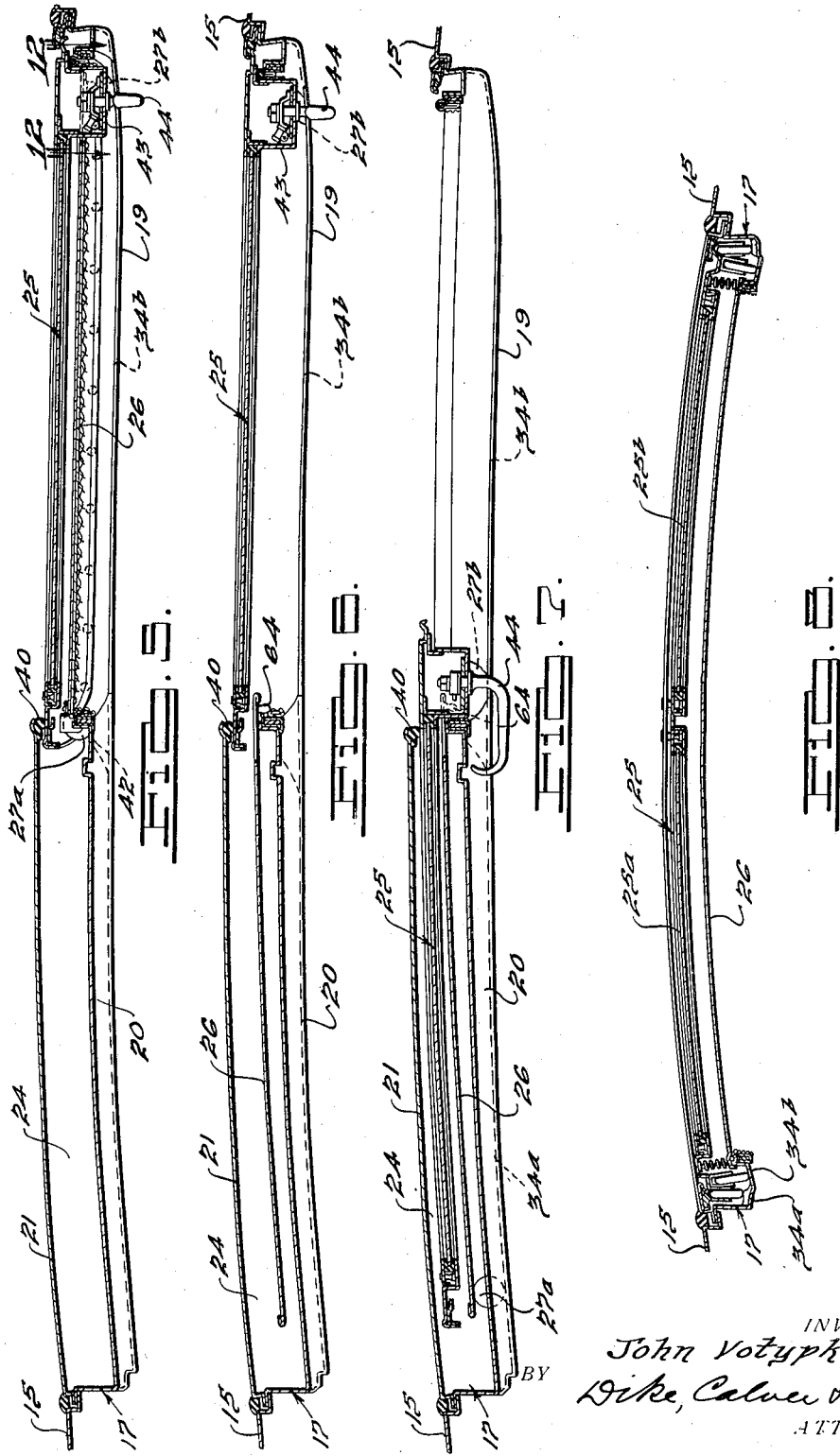

March 12, 1940.  J. VOTYPKA  2,193,607
VEHICLE BODY
Filed April 19, 1937  3 Sheets-Sheet 3
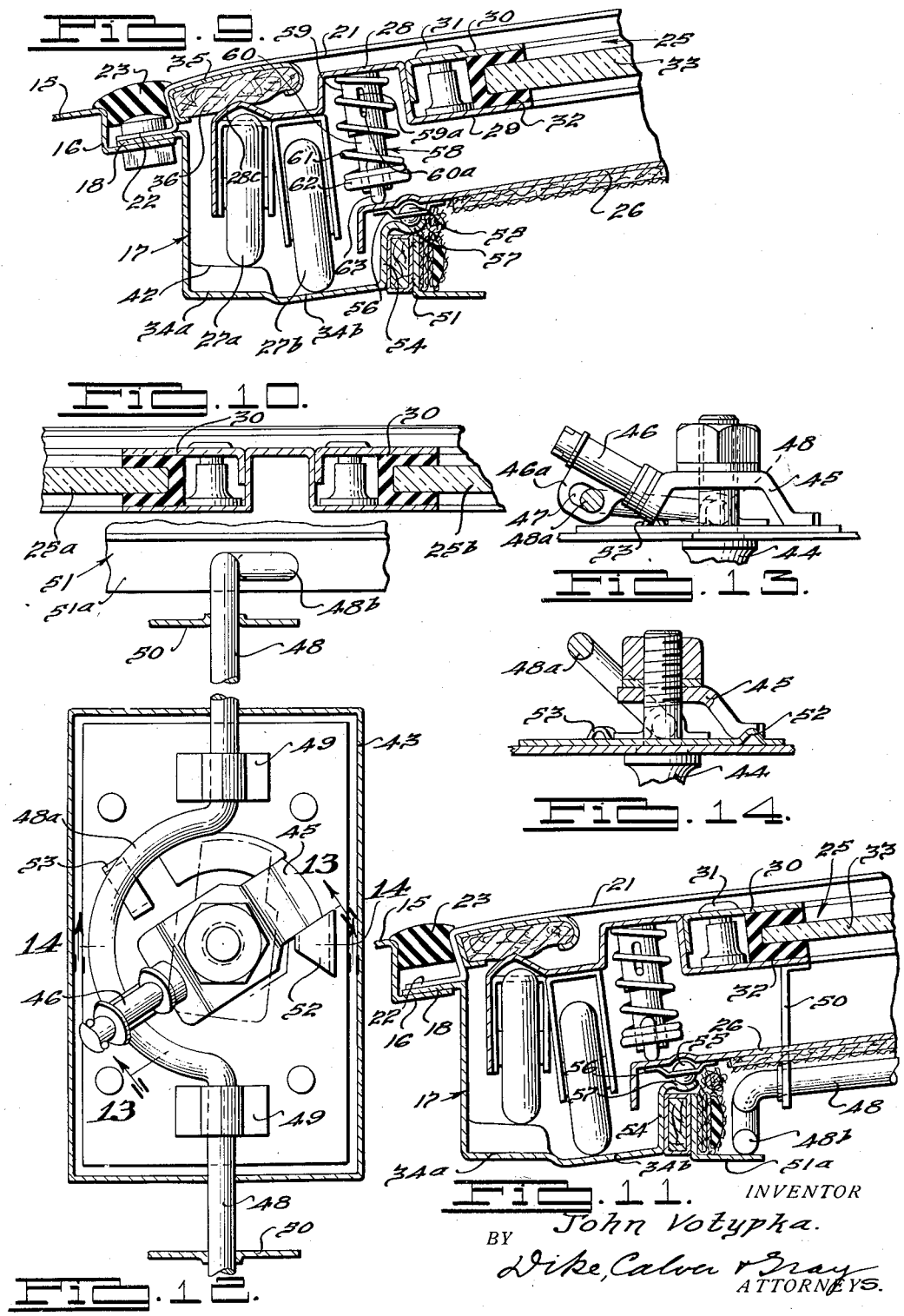
INVENTOR
John Votypka.
BY Dike, Calvin & Gray
ATTORNEYS.

UNITED STATES PATENT OFFICE 2,193,607

VEHICLE BODY

John Votypka, Detroit, Mich., assignor to Briggs Manufacturing Company, Detroit, Mich., a corporation of Michigan Application April 19, 1937, Serial No. 137,728

9 Claims. (Cl. 296—137)

This invention relates to vehicle bodies and more particularly, although not exclusively, to closed automobile bodies of the type having an opening in the roof thereof controlled by means of a sliding roof panel.

One of the objects of the present invention is to provide a closed vehicle body having a roof with an opening therein and a longitudinally slidable or adjustable roof panel supported, guided and controlled in an improved manner, whereby it is possible to attain in a closed vehicle body many advantages heretofore possessed by bodies of the open type only.

Another object of the invention is to provide a vehicle body of the foregoing character, in which means are provided enabling the occupants to enjoy in winter as well as in summer or during a rainy season advantages afforded by the open roof bodies.

Still another object of the invention is to provide a vehicle body having an opening in the roof thereof, which opening may be selectively kept entirely open, admitting the sunlight and fresh air, or be closed by a transparent panel, as may be desirable in winter or during rainy weather; or, finally be entirely closed, whereby the body is converted into a closed body for the purpose of attaining the advantages afforded by bodies of the closed type.

A further object of the invention is to provide a vehicle body of the foregoing character, in which the glass or transparent roof panel is made slidable and, therefore, opening and closing thereof is easily and simply done, and which in addition may be accomplished by the occupants of the vehicle, if desired. In prior structures having insertable glass panels, insertion and removal thereof could not be so conveniently done.

A still further object of the invention is to provide an improved vehicle body with a slidable metal roof panel and a slidable glass or transparent roof panel, which panels may be moved into their respective closed or open positions either separately or simultaneously.

A still further object of the invention is to provide an improved vehicle body having a roof curved both transversely and longitudinally of the vehicle and a sliding glass or transparent roof panel which is substantially straight longitudinally of the vehicle, and wherein means are provided to close the clearance space or opening produced between said longitudinally curved roof and the longitudinally straight glass panel by the sliding of said panel.

A still further object of the invention is to provide a vehicle body with a sliding metal roof panel and a sliding glass or transparent roof panel and wherein means are provided to seal said panels against draft and water leakage.

An additional object of the invention is to provide an improved vehicle body of the character specified, which is relatively simple in construction and dependable in operation, and which is relatively cheap to manufacture and service.

Other objects and advantages of this invention will appear in the following description and appended claims, when considered in connection with the accompanying drawings forming a part of this specification, wherein like reference characters designate corresponding parts in the several views.

Fig. 1 is a perspective view of a vehicle body embodying the present invention.

Fig. 2 is a fragmentary sectional view taken on the line 2—2 of Fig. 1 looking in the direction of the arrows.

Fig. 3 is a fragmentary sectional view taken in the direction of the arrows, section being taken on the line 3—3 of Fig. 1.

Fig. 4 is a fragmentary sectional view in the direction of the arrows, section being taken on the line 4—4 of Fig. 1.

Fig. 5 is a longitudinal sectional view taken on the line 5—5 of Fig. 1 looking in the direction of the arrows, and illustrating the respective positions of the movable glass panel and of the movable non-transparent panel when both of said panels are closed.

Fig. 6 is a view similar in part to Fig. 5, the non-transparent panel being shown in its open position.

Fig. 7 is a view similar in part to Fig. 5, both of said panels being shown in their open positions.

Fig. 8 is a transverse sectional view through the roof structure taken on the line 8—8 of Fig. 1.

Fig. 9 is a fragmentary sectional view taken on the line 9—9 of Fig. 1 looking in the direction of the arrows and illustrating the roller means provided on said panels as well as the tracks with which the same cooperate.

Fig. 10 is a transverse sectional view in the direction of the arrows, section being taken on the line 10—10 of Fig. 1, said view illustrating the method of joining the sections of the movable glass panel.

Fig. 11 is a view similar in part of Fig. 9 and showing the friction lock for adjusting the glass panel in a desired position.

Fig. 12 is a sectional view taken on the line 12—12 of Fig. 5 and looking down on the locking mechanism.

Figs. 13 and 14 illustrate the upper part of the lock operating handle in two different working positions thereof.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there are illustrated certain preferred embodiments of the invention as applied to an automobile body of the cab type having a metal roof and an opening therein controlled by a sliding glass panel and a non-transparent panel arranged under said glass panel, said panels being movable toward the front of the vehicle for uncovering the opening located at the rear of the vehicle body. It will be understood, however, that the body may be constructed so that the sliding panels will control an opening located at the front portion of the roof. It is also understood that the term "glass" herein used is intended to be construed in a broad sense to refer to any kind of transparent or translucent material of which the panel may be conveniently made.

Referring to the drawings and particularly to Fig. 1, there is shown a vehicle body having a roof indicated generally by the numeral 15 which roof is suitably supported by the body frame structure, not shown, the cover sheets forming the outside surfaces of said roof 15 merging smoothly and seamlessly with the panels or sheets forming the side, the front and the rear panels of the body.

The roof 15 is provided with a generally rectangular opening extending substantially throughout the entire length of the roof. The edges of said roof 15 around the opening are pressed downward to provide a shoulder flange 16. Within said roof opening there is arranged a pan-like or sub-panel 17 adapted to rest with its outwardly directed flanges 18 upon the shoulder flanges 16 of the roof. In the rear portion or half of the bottom of said sub-panel 17 there is provided a generally rectangular skylight opening 19, which opening is surrounded on the three sides thereof by the narrow flanges formed by said bottom, while on its fourth side said bottom forms a wide closed portion 20 covering about one-half of said roof opening.

Within the roof opening and above said closed portion 20 there is provided an upper fixed panel 21 arranged substantially flush with the roof 15 and resting with its angle flanges 22 upon the flanges 18 of the pan-like panel or sub-panel 17, see Fig. 2. A rubber strip 23 is provided between the panel 21 and the roof 15 for the purpose of covering the juncture of the flanges 22, 18 and 16, which flanges are connected together in any suitable manner such as by means of spot welding, rivets, bolts or the like. By virtue of the above described construction a pocket 24 is formed in the front part of the roof opening, into which pocket a glass panel 25 and a metal panel 26 may be moved to open the skylight opening 19.

When said panels 25 and 26 are moved out from said pocket 24 as illustrated in Fig. 5, the skylight opening 19 is non-transparently closed and the vehicle body is thereby converted into a body of the closed type. If the metal panel 26 is moved into the pocket 24 as illustrated in Fig. 6 the skylight opening 19 is transparently closed by means of the glass panel 25 and the light is admitted through said panel 25 without bringing about inconveniences to the occupants which might result if the skylight opening 19 were open in winter time or in time of a rain. Such an arrangement permits sight seeing from vehicles such as taxicabs and the enjoyment of sunlight without subjecting the passengers to inclement weather. In summer time both the glass panel 25 and the metal panel 26 may be opened as illustrated in Fig. 7 uncovering the skylight opening 19, admitting the light and the fresh air into the vehicle, and enabling the occupants to enjoy the advantages which have heretofore been afforded only by vehicles of the open convertible type.

Thus, there is formed, in effect, in the vehicle body, a roof of a double wall construction, the roof sheet 15 and the upper fixed panel 21 forming the upper wall, and the sub-panel 17 forming the lower wall of said double wall roof, the panels 25 and 26 being movable within the space formed between said walls.

It is preferable to make the glass panel 25 of two symmetrical halves 25a and 25b in order to make said panels more stiff and less liable to break, and in order to cause the panel to conform to the transverse curvature of the roof without the necessity of making the glass panel out of expensive curved glass.

In the present embodiment of the invention movements of the glass panel 25 are greatly facilitated by providing rolling means carried by said panel and cooperating with suitably shaped tracks provided along the sides of the roof opening. In the present embodiment said means are exemplified by rollers 27 carried by the flange 28 integrally formed with the lower part 29 of a panel frame which extends around all four sides of the panel 25. The upper frame member of this panel frame is indicated, see Fig. 9, by the numeral 30, and it is connected with said lower part 29 by means of connectors 31, a rubber gasket 32 being provided between the edges of the glass plate 33 and the frame in order to ensure a tight and a rattle-proof connection of said frame with the glass plate 33.

The rollers 27a carried by the glass panel 25 at the front thereof and at opposite longitudinal sides of the roof cooperate with tracks 34a formed in the bottom of the closed portion 20 of the pan-like panel 17, while the rollers 27b carried by the glass panel 25 at the rear edge thereof at opposite longitudinal sides of the roof are staggered or displaced inwardly of the roof with respect to the rollers 27b and cooperate with tracks 34b formed in the bottom of the pan-like panel 17 along the sides of the skylight opening 19.

For the purpose of providing a weather seal around said glass panel 25 when said panel is in its closed position, there is provided along the rear portion of the sides of the roof opening and the rear edge thereof an overhanging flange 35 supporting a waterproofed felt strip 36 bearing upon the rear portion 28a of the flange 28 as well as the sides thereof (see Fig. 4). The portion 35a of the overhanging flange 35 is adapted to rest on the flange 18 of the pan-like panel 17 and it is connected to said flange 18 and the flange 16 of the roof by means of a plurality of connectors 37. Along the rear edge of the skylight opening 19 there is provided a conventional windlace indicated generally by the numeral 38, said windlace being adapted to be supported by the flange 28, as shown in Fig. 4, an upholstery or headlining 39 being fastened to the windlace.

For the purpose of sealing the front edge of the glass panel 25 a rubber strip 40 is provided along the rear edge of the fixed panel 21, said strip being secured to the panel by means of a fastener strip 41. It will now be understood that when the glass panel 25 is in its fully closed position, it is sealed against leakage and draft as well as against the possibility of rattling around all four sides, since the front portion 28b of the flange 28 is in contact under pressure with the strip 40, and the rear V-shaped back portion 28a and V-shaped side portions 28c are in contact under pressure with the felt strip 36. A continuous seal around the edges of the opening is thus provided.

In accordance with the present invention means are provided whereby the front edge of the glass panel 21 is brought into contact with the rear edge of the panel 21 provided with a rubber sealing strip 40. In the present embodiment of the invention said means are exemplified by raised portions or ramps 42 formed in the tracks 34a near the rear edge of the panel 21. It will be understood that from an examination of Figs. 5 and 9 that as the panel is moved into its closed position the front rollers 27a ride over said portion 42 thereby bringing the flange 28b into contact under pressure with the sealing strip 40 and effecting the desired seal.

As the panel 25 is moved forward for uncovering the skylight opening 19, the rollers 25a run down the ramps 42 and continue running along the substantially horizontal tracks 34a in the pocket or compartment 24, while the rollers 27b run in and along the tracks 34b along side of the skylight opening 19. Thus, in the position illustrated in Fig. 7, the glass panel 25 is securely held on the tracks 34a, any upward movements being prevented by felt lined flanges (not shown) similar in construction to flanges 35 and arranged in the pocket or compartment 24.

For the purpose of locking the glass panel 25 in any desired position along its path of travel, there is provided at the rear edge thereof a locking device housed in a casing 43 secured to the panel in any suitable manner. The locking device comprises a handle 44 rotatably mounted in the bottom of said casing 43 and carrying on its upper end a bracket 45 constrained to rotate therewith. Said bracket 45 carries a finger 46 provided with a downwardly directed extension 46a in which there is provided a hole 47 through which is passed the locking bar 48. The locking bar 48 is bent to provide an arcuate middle portion 48a and downwardly directed curved cam-like ends 48b. Said locking bar 48 is journalled in brackets 49 and 50 secured to the glass panel 25, the metal panel 26 being slotted to allow passage of the brackets 50. The longitudinal axis of the locking bar 48 is situated somewhat lower than the hole 47, in consequence whereof as the finger 46 turns following the arcuate portion 48a of said bar in response to the turning movement of the handle 44, the bar 48 is turned through a certain angle and the cam ends 48b engage the flange 51a of longitudinal brackets 51 secured to the panel 17 along the sides of said skylight opening 19. When said cam ends of the bar 48 are pressed against said flange 51a they engage the same by friction, locking said panel 25 in the desired position. A stop 52 is provided on the bottom of the casing 43 for the purpose of preventing rotation of the bracket 45 and the handle 44 beyond a predetermined point. A support 53 is similarly provided for the purpose of supporting said arcuate portion 48a above the axis of the bar thereby preventing undesirable self-locking of the device.

Under certain conditions it may become desirable for the occupants of the vehicle to close non-transparently the skylight opening 19. In accordance with the invention the same may be effected with the aid of a non-transparent curtain provided under the glass panel 25. In the present embodiment the function of such a curtain is performed by the movable metal panel 26 which is suitably trimmed and upholstered from the inside to match the upholstery of the body interior. Said metal panel 26 is provided along its side edges with a plurality of balls 55 held by the retainer strip 56, which balls cooperate with the tracks 57 formed in the flanges of the pan-like panel 17. Similar tracks extend in alignment with tracks 57 into the pocket 24 to support the panel 26 when it is shifted into the pocket to its open position illustrated in Fig. 6.

For the purpose of pressing the panel 26 down against said tracks 57 as well as against the windlace there is provided at opposite sides a plurality of pressure maintaining devices 58. Each of said devices comprises two telescoping members 59 and 60, member 59 being secured to the glass panel flange 28 and provided with a slot 59a cooperating with a pin 60a on the lower member 60 which pin prevents separation of the telescoping members. The telescoping member 60 is held in its extended position by means of a spring 61, the lower extremity of which bears on the washer 62 secured to the member 60. A roller 63 is carried by the member 60, this roller cooperating with the edges of the panel 26 to press the edges downward. Suitable handles or knobs 64 are provided on the panel 26 which may be grasped so as to manually shift the panel into the pocket 24. A portion of the panel 26 at the rear edge thereof is cut out to accommodate the casing 43 and to permit full closing of the skylight opening by the panel 26.

It will be understood from the above description that when the glass panel 25 is moved into the pocket 24, the metal panel 26 is moved therewith, thereby fully uncovering the skylight opening 19. Thereupon, it is possible to move the glass panel 25 into its closed position independently of the metal panel 26. In the closed position of the glass panel it is possible to move the metal panel 26 independently of said glass panel into and out of closed positions. It will be understood that by providing upstanding flanges 54 at opposite longitudinal sides to support the tracks 57, the bottom portions of the pan-like panel 17 form along the sides of the skylight opening channels or gutters serving to collect and drain off any rain water which may leak past the panel 25.

I claim:

1. In a vehicle body, a roof having an opening therein, a slidable transparent panel movable into and out of position to close said opening, and a substantially rigid slidable non-transparent panel adapted to be moved independently of said transparent panel, when the same is closed, into and out of position to close said opening and to be disposed in the closed position underneath said transparent panel.

2. In a vehicle body, a roof having an opening therein, an upper fixed panel arranged in said opening substantially flush with the roof and closing a part of said opening, a lower fixed panel arranged in said opening underneath said upper fixed panel to form a pocket in the roof structure, a glass panel movable into said pocket to open said opening and out of said pocket to close the same, and a substantially rigid non-transparent panel movable into and out of position to close non-transparently said opening and adapted to be disposed in the closed position underneath said transparent panel.

3. In a vehicle body, a roof having an opening therein, an upper fixed panel arranged in said opening substantially flush with the roof and closing a part of said opening, a lower fixed panel arranged underneath said upper fixed panel to form a pocket, a glass panel movable into said pocket to open said opening and out of said pocket to close the same, and a substantially rigid non-transparent panel movable into said pocket together with said glass panel to open said opening, said non-transparent panel being adapted to be moved into and out of said pocket independently of said glass panel when the same is closed and to be disposed underneath thereof.

4. In a vehicle body, a double-wall roof, the upper and the lower walls of said roof being provided with two registering openings, a glass panel movable within the space formed by said walls, resilient sealing means secured to the upper wall along the edges of the opening provided therein, said glass panel being adapted to come in its closed position in contact under positive pressure with said sealing means, and a substantially rigid non-transparent panel arranged underneath said glass panel and movable in the space formed by said walls to cover non-transparently the opening provided in said lower wall.

5. In a vehicle body, a double-wall roof, the upper and the lower walls of said roof being provided with two registering openings, a glass panel movable within the space formed by said walls, resilient sealing means secured to the upper wall along the edges of the opening provided therein, said glass panel being adapted to come in its closed position in contact under positive pressure with said sealing means, a substantially rigid non-transparent panel arranged underneath said glass panel and movable in the space formed by said walls to cover non-transparently the opening provided in said lower wall, and tracks formed on said lower wall along the sides thereof for guiding said glass panel and said non-transparent panel, said non-transparent panel being adapted to be moved independently of said glass panel when the same is closed.

6. In a vehicle body, a double-wall roof, the upper and the lower walls of said roof being provided with two registering openings, a glass panel movable within the space formed by said walls, resilient sealing means secured to the upper wall along the edges of the opening provided therein, said glass panel being adapted to come in its closed position in contact under positive pressure with said sealing means, a substantially rigid non-transparent panel arranged underneath said glass panel and movable in the space formed by said walls to cover non-transparently the opening provided in said lower wall, a plurality of rollers adapted to maintain a predetermined clearance between said movable panels.

7. In a vehicle body, a double-wall roof, the upper and the lower walls of said roof being provided with two registering openings, a glass panel movable within the space formed by said walls, resilient sealing means secured to the upper wall along the edges of the opening provided therein, said glass panel being adapted to come in its closed position in contact under positive pressure with said sealing means, a substantially rigid non-transparent panel arranged underneath said glass panel and movable in the space formed by said walls to cover non-transparently the opening provided in said lower wall, and means for locking said glass panel in various adjusted positions with respect to said roof openings.

8. In a vehicle body, a double-wall roof, the upper and the lower walls of said roof being provided with two registering openings, a glass panel movable within the space formed by said walls, sealing means secured to the upper wall along the edges of the opening provided therein, a substantially rigid non-transparent panel movable in the space formed by said walls to cover non-transparently one of said registering openings, one of said panels being adapted to come in its closed position in contact with said sealing means and said panels being arranged in superimposed relation and effective in combination to close both of said openings.

9. In a vehicle body, a roof comprising an upper sheet structure, a pan-like sub-panel provided under said upper sheet structure to form a double wall roof, said sub-panel being adapted to collect leaking water, the upper sheet and the sub-panel being provided with two registering openings, a substantially rigid non-transparent panel and a transparent panel arranged in superimposed relation, said panels being supported by said sub-panel and adapted to move in the space between said upper sheet and said sub-panel and to open and to close selectively said openings.

JOHN VOTYPKA.